(12) United States Patent
Wu et al.

(10) Patent No.: US 8,257,800 B2
(45) Date of Patent: Sep. 4, 2012

(54) RETARDATION FILM AND METHOD FOR MANUFACTURING THE SAME

(75) Inventors: Ching-Mao Wu, Keelung (TW); Ming-Tzung Wu, Yunlin County (TW); Kuo-Tung Huang, Hsinchu County (TW)

(73) Assignee: Industrial Technology Research Institute, Hsinchu County (TW)

( * ) Notice: Subject to any disclaimer, the term of this patent is extended or adjusted under 35 U.S.C. 154(b) by 632 days.

(21) Appl. No.: 12/496,547

(22) Filed: Jul. 1, 2009

(65) Prior Publication Data

US 2010/0079720 A1    Apr. 1, 2010

(30) Foreign Application Priority Data

Sep. 30, 2008 (TW) ................................ 97137486 A
Jun. 2, 2009 (TW) ................................ 98118148 A (51) Int. Cl.
C09K 19/02 (2006.01)
C09K 19/06 (2006.01)
C09K 19/54 (2006.01)
G02F 1/13363 (2006.01)

(52) U.S. Cl. .................. 428/1.1; 252/299.01; 252/299.5; 252/299.6; 349/117; 349/183; 349/185

(58) Field of Classification Search ............. 252/299.01, 252/299.5, 299.6; 428/1.1, 1.2; 349/117, 349/183, 185
See application file for complete search history.

(56) References Cited

U.S. PATENT DOCUMENTS

| | | |
|---|---|---|
| 5,583,679 A | 12/1996 | Ito et al. |
| 6,141,075 A | 10/2000 | Ohmuro et al. |
| 6,281,956 B1 | 8/2001 | Ohmuro et al. |
| 6,417,902 B1 | 7/2002 | Greenfield et al. |
| 6,421,107 B1 | 7/2002 | Greenfield et al. |
| 7,477,343 B2 | 1/2009 | Skjonnemand et al. |
| 2003/0137632 A1* | 7/2003 | Kawabata ............. 349/156 |
| 2005/0062917 A1* | 3/2005 | Kashima .............. 349/120 |

FOREIGN PATENT DOCUMENTS

| | | |
|---|---|---|
| TW | I284230 | 7/2007 |
| WO | 0120393 A1 | 3/2001 |
| WO | 0120394 A1 | 3/2001 |
| WO | 2004013666 A1 | 2/2004 |

* cited by examiner

*Primary Examiner* — Shean C Wu (74) *Attorney, Agent, or Firm* — Pai Patent & Trademark Law Firm; Chao-Chang David Fai (57) ABSTRACT

A retardation film and formula thereof, and method for manufacturing the same are provided. Furthermore, the retardation film is applied to compensate TFT-LCD viewing angle. Referring to the formula of the invention, the positive A film-embedded negative C optically anisotropic coating of the retardation film can be formed by single step coating, and the retardation film with net negative C symmetry in whole is easily manufactured.

14 Claims, 8 Drawing Sheets

RETARDATION FILM AND METHOD FOR MANUFACTURING THE SAME

CROSS REFERENCE TO RELATED APPLICATIONS

This Application claims priority of Taiwan Patent Application No. 097137486, filed on Sep. 30, 2008, and Taiwan Patent Application No. 98118148, filed on Jun. 2, 2009, the entirety of which is incorporated by reference herein.

BACKGROUND OF THE INVENTION

1. Field of the Invention

The present invention relates to a liquid crystal composition and a method for manufacturing the same, and in particular relates to manufacture a positive A film-embedded negative C optically anisotropic coating applied in a vertical alignment LCD.

2. Description of the Related Art

Phase compensator film or retardation film is used to solve large viewing angle problems for LCDs. The large viewing angle problems include reduction in contrast ratio, gray scale instability, gray scale inversion, color shift, and the likes. Conventional retardation films were made of polymer substrates formed by uniaxial stretching or biaxial stretching. However, with retardation value (R) equal to birefringence ($\Delta n$) times film thickness (d), because the birefringence of polymer materials is low, film thickness is required to be very thick to obtain appropriate retardation value. Thus, manufacturing yield of retardation films using polymer substrates are low as the conventional process requires costly machinery for stretching and control of the three dimensional refractive index ($n_x$, $n_y$, and $n_z$) is difficult.

Normally, liquid crystal cell comprising rod-like molecules with positive birefringence can be counteracted by the optically anisotropic coating of retardation film with negative birefringence. For that, Fuji Photo Film, Ltd. (Japan) has disclosed a retardation film, prepared from disc-like liquid crystal molecules (named wide-view film), which is applied in TN or STN type LCDs. In U.S. Pat. No. 5,583,679, the described wide-view film was disclosed to be constituted by a three layered structure: a transparent polymer substrate bottom layer, a middle alignment layer for aligning the liquid crystal molecules, and an optically anisotropic top layer including hybrid aligned photopolymerizable disc-like liquid crystal molecules. Because disc-like liquid crystal molecules have inherently negative birefringence, the positive birefringence of the rod-like molecules in the liquid crystal cell can be counteracted. Furthermore, the wide-view film is formed by coating without additional stretching, therefore the thin retardation film is suitable for mass production by roll-to-roll manufacturing methods.

Recently, because various molecular alignments have been disclosed, mass producing optically anisotropic coatings of retardation film based on rod-like liquid crystal molecules are also developed. For example, a positive C (+C) optically anisotropic coating has rod-like liquid crystal molecules vertically aligned with a film surface, wherein the optically anisotropic coating has a refractive index of an x-axis similar to the refractive index of a y-axis, and the refractive index of the y-axis is less than the refractive index of the z-axis ($n_x \sim n_y < n_z$). A positive A (+A) optically anisotropic coating has rod-like liquid crystal molecules parallel aligned with a film surface, wherein the refractive index of an x-axis is greater than the refractive index of a y-axis, and the refractive index of the y-axis is similar to the refractive index of a z-axis ($n_x > n_y \sim n_z$). A cholesteric or negative C (−C) optically anisotropic coating has helical arranged rod-like liquid crystal molecules and the helical axis is vertically aligned with a film surface, wherein the optically anisotropic coating has a refractive index of an x-axis similar to the refractive index of a y-axis, and the refractive index of the y-axis is greater than the refractive index of a z-axis ($n_x \sim n_y > n_z$). An O optically anisotropic coating has rod-like liquid crystal molecules having a specific length axes tilt aligned with a film surface. A twisted nematic optically anisotropic coating has rod-like liquid crystal molecules arranged twist-like from 180° to 250°. A hybrid nematic optically anisotropic coating has rod-like liquid crystal molecules having a length axes tilt aligned with a film surface in continuous angles from 30° to 60°. The corresponding references disclosed that the optically anisotropic coatings can be used alone or in combination to compensate for viewing angle problems of different liquid crystal cells. For example, the twisted nematic optically anisotropic coating is applied to compensate for coloration problems and enhance contrast of STN-LCDs (see SID'95 Digest, 567 and SID'01 Digest, 452). Meanwhile, because hybrid nematic optically anisotropic coatings have similar symmetric molecular arrangements to the liquid crystal molecular arrangement of TN liquid crystal cells and ECB liquid crystal cell, integration of hybrid nematic optically anisotropic coatings may improve viewing angle properties (see SID'02 Digest, 762 and SID'05 Digest, 742). Additionally, because +C optically anisotropic coatings have rod-like liquid crystal molecules vertically aligned with a film surface, it can be applied in IPS-LCDs and circular polarized VA-LCDs (see SID'07 Digest, 1555).

In addition, cholesteric or negative C optically anisotropic coatings may improve viewing angles of VA-LCDs, because rod-like liquid crystal molecules in VA-LCD cells are vertically aligned in a non-driving state, its compensative effect is similar to +C optically anisotropic coatings due to its inherently positive retardation value. However, a typical 4 μm thick VA-LCD cell will over compensate and usually requires cholesteric or negative C optically anisotropic coating to counteract with a positive retardation value to obtain the best dark state. U.S. Pat. No. 6,141,075, WIPO Pat. No. WO 01/20393 and WO 01/20394 have disclosed that viewing angle compensation of VA-LCDs and TN-LCDs requires to collocate the positive and negative optically anisotropic coatings, wherein the negative optically anisotropic coatings should be −C optically anisotropic coatings. U.S. Pat. Nos. 6,141,075 and 6,281,956 also adopt a positive optically anisotropic coating collocated with a negative optically anisotropic coating to compensate for VA-LCD viewing angle problems. The described collocation of the positive and negative optically anisotropic coatings can be replaced by one or two pieces of biaxial stretching plastic plates such as triacetate cellulose (TAC) films. However, the stretched TAC film has very low birefringence, and it is necessary to use thicknesses of ten to hundred micrometers to obtain sufficient retardation value. Alternatively, side-stretching extrusion or casting of TAC films is possible, however, it is very difficult, and it is not easy to mass produce TAC films with acceptable yields. The WIPO Pat. No. WO 01/20393 disclosed that negative optically anisotropic coatings should be cholesteric type composed of UV photopolymerizable cholesteric liquid crystal (UV-CLC) molecules. Therein, UV-CLC molecules are spirally arranged with a short helical pitch (less than 200 nm) that is shorter than the wavelength of visible light. The patent also disclosed that the negative C optically anisotropic coating prepared from UV-CLC molecules had higher birefringence value and thinner thickness than a biaxial stretching plastic plate. In addition, the optically anisotropic coating can be mass produced by a roll-to-roll manufacturing methods.

A negative C optically anisotropic coating composed of pure UV-CLC molecules has a thickness of about 1 μm to 5 μm, such that retardation value depends on birefringence value (Δn). Conventional rod-like liquid crystal molecules have an Δn of about 0.1 to 0.16, and conventional disc-like liquid crystal molecules have an Δn of about 0.1 to 0.3. Meanwhile, the synthesis of photopolymerizable disc-like liquid crystal molecules requires time-consuming multi-steps, the disc-like alignment is difficult, and the preparation of room temperature nematic disc-like liquid crystals is difficult. As such, enhancement of retardation value is an important area of the UV-CLC formula. In addition, WO 01/20393 also disclosed that the viewing angle compensation of VA-LCDs and TN-LCDs require hybrid collocation of positive A and negative C optically anisotropic coatings to obtain a best dark state. However, conventional positive A and negative C optically anisotropic coatings are prepared in different steps and then adhered to top and bottom polarizer plates, respectively. Alternatively, positive A optically anisotropic coatings can be firstly prepared, and cholesteric liquid crystal molecules can be directly coated on the surface of the positive A optically anisotropic coating to form another negative C optically anisotropic coating. However, the bi-layered film from dual coating steps result in air gaps therebetween and non-uniformity. In addition, the upper negative C optically anisotropic coating is limited by the alignment ability of the lower positive A optically anisotropic coating, thereby resulting in formation of a foggy appearance and reduced transparency. Accordingly, adjusting the UV-CLC formula so that a single step coating is used to form a positive A optically anisotropic coating that directly contacts a negative C optically anisotropic coating is called for.

BRIEF SUMMARY OF THE INVENTION

The invention provides a retardation film, comprising an alignment substrate; and an optically anisotropic coating on the alignment substrate; wherein the optically anisotropic coating comprises a photopolymerizable cholesteric liquid crystal composition and rectangular disc-like molecules; wherein the photopolymerizable cholesteric liquid crystal composition comprises: (a) achiral photopolymerizable rod-like liquid crystal molecules; (b) a chiral compound; (c) a photo initiator; and (d) a nonionic surfactant.

The invention also provides a method for forming a retardation film, comprising: providing an alignment substrate; forming an optically anisotropic coating on the alignment substrate, wherein the optically anisotropic coating comprises a photopolymerizable cholesteric liquid crystal composition and rectangular disc-like molecules, wherein the photopolymerizable cholesteric liquid crystal composition comprises: (a) achiral photopolymerizable rod-like liquid crystal molecules; (b) a chiral compound; (c) a photo initiator; (d) a nonionic surfactant; and (e) an organic solvent; setting and drying the optically anisotropic coating; heating the optically anisotropic coating to align with the liquid crystal molecules according to the alignment direction of the alignment substrate; and UV curing the optically anisotropic coating.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides an optically anisotropic coating composed of a positive A and negative C liquid crystal system. In practice, a major part of the optically anisotropic coating is a commercially available photopolymerizable cholesteric liquid crystal (UV-CLC) system used to prepare negative C optically anisotropic coatings. The UV-CLC molecules are helically arranged with a short helical pitch (less than 200 nm) that is shorter than the wavelength of visible light. A composition and manufacturing of the UV-CLC were disclosed in U.S. Pat. No. 6,421,107. A UV-CLC composition usually includes: (a) 5 to 50, preferably 5 to 30, parts by weight percent of achiral photopolymerizable rod-like liquid crystal molecules such as 2-methyl-1,4-phenylene-bis[4-(6-acryloyl-oxyhexyloxy)-benzoate], 4-(3-acryloyloxy-propyloxy)-benzoic acid 2-methyl-1,4-phenylene ester, the likes, or combinations thereof, (b) 0.3 to 13, preferably 0.5 to 8, parts by weight percent of photopolymerizable or non-photopolymerizable a chiral compound such as Paliocolor LC756 commercially available from BASF AG, Ludwigshafen, Germany; (c) 0.3 to 8, preferably 1 to 5, parts by weight percent of a photo initiator such as Irgacure 907 commercially available from Ciba AG, Basel, Switzerland to initiate radical polymerization; (d) 0.1 to 5, preferably 0.5 to 2, parts by weight percent of a nonionic surfactant such as Fluorad FC 171 commercially available from 3M or Zonyl FSN commercially available from Dupont; and (e) 25 to 70, preferably 30 to 60, parts by weight of an organic solvent such as toluene or cyclohexanone. After coated on an alignment layer and then dried to form a film, the (b) chiral compound will induce (a) achiral photopolymerizable rod-like liquid crystal molecules to be arranged in a highly twisted helical structure with short helical pitches. Formula 1 shows the relation between twisted angle ((p) helical pitch (p), and film thickness (d):

$$\phi = (360° * d)/p \quad \text{(Formula 1).}$$

According to Formula 1, the helical pitch of the UV-CLC film should be shorter than the wavelength of visible light, thereby avoiding visible light reflection when circularly polarized light passes through the UV-CLC film. As such, the twisted angle should be a 20 to 30 times 360° twisted angle. If the helical pitch is shorter than 200 nm, visible light is entirely prevented from influencing and being reflected from the UV-CLC film. Therefore, the UV-CLC has negative optical symmetry with a three dimensional refractive index of $n_x \sim n_y > n_z$. Presently, the UV-CLC solution system can be commercially available such as a Reactive Mesogens (RM) series provided by Merck. The RM series, containing additives for coating and required optical properties, can be coated at room temperature and then dried to form film with high transparency, negative C symmetry, and high surface pencil hardness. Note that the RMS06-270 (RM series) is selected in Examples of the invention, however, the UV-CLC system of the invention also includes other commercially available or self-prepared systems and are not limited to RMS06-270.

Subsequently, an additive inducing the formation of positive A optically anisotropic coating is added to the described negative C coating composition (UV-CLC system) to prepare a liquid crystal system having positive A optical properties therein. The additive is a disc-like molecule (herein, referred after as DM) has a disk core and long chain functional groups around the core. A suitable DM for the invention does not absorb visible light, and its depolarization ratio is less than 1. Although commercially available DM can be chosen such as triphenylene and derivatives thereof, N,N'-bis-(3-methylphenyl)-N,N'-bis-(phenylbenzidine) and derivatives thereof, the DM size and structure is preferably similar to the rod-like photopolymerizable liquid crystal molecule. The DM core is preferably square and capable to the rod-like photopolymerizable liquid crystal molecule. In the invention, the DM structure only includes the core since most commercially available products lack long-chain functional groups around the core. Therefore, the invention uses N,N'-bis-(3-methylphenyl)-N,N'-bis-(phenylbenzidine) and its derivatives from numerous DMs, and its formula is shown as Formula 2:

(Formula 2)

wherein each of $R_1$ and $R_2$, being the same or different, is hydrogen, alkyl group, phenyl group, or benzyl group.

The described DM is weighted according to a required weight ratio and then added to the UV-CLC solution system to prepare the optically anisotropic coating. For example, the RMS06-270 solid content and the N,N'-bis-(3-methylphenyl)-N,N'-bis-(phenylbenzidine) DM have a weight ratio of 100:0.5 to 100:8.

Subsequently, the optically anisotropic coating is coated by spin coating or slot-die coating on the alignment substrate to form a coating layer. The alignment substrate can be a transparent substrate with an alignment layer thereon, or a surface-treated transparent substrate. The transparent substrate material is generally used material such as glass or polymer plastic substrate. If polymer plastic substrate is adopted, it should be negative C symmetrical, and equal to or greater than 80% optical transparency. Many polymer plastic substrates are presently commercially available, however, poly ester cellulose and di-or tri-acetate cellulose (DAC or TAC) is preferable for retardation film in LCDs due to its high optical transparency (>90%).

For aligning the liquid crystal molecules in the optically anisotropic coating in a specific arrangement direction with specific pre-tilt angle, the invention requires the above alignment film or surface-treated alignment transparent substrate. The alignment film can be a generally used polymer film. The alignment film is formed on the transparent substrate by known coating methods such as spin coating and extrusion coating, dried, and then surface treated to complete the alignment process. The polymer film has a plurality of microgrooves arranged in a specific direction on the surface. A suitable polymer for alignment layer includes commercially available polyimide (PI), polyvinyl alcohol (PVA), and the likes, but PI is mostly used due to its high optical transparency, excellent mechanical property, and thermal stability. In addition, the references disclose a multitude of alignment processes such as rubbing, tilt evaporation, ion beam, plasma, dipping, and the likes. The most commonly used method is the rubbing method, wherein paper or velvet fabric is used to rub the alignment layer surface to form microgrooves arranged in a specific direction and pre-tilt angle. The microgrooves, having micro scaled inter microgroove spacing and depths, are uniformly arranged toward a specific direction. In addition, the rubbing process is optionally repeated to obtain required groove spacing, depth, and tilt angle. The groove factors are controlled by rubbing density (L/l) as shown in Formula 3:

$$\frac{L}{l} = N\left(\frac{2\pi rn}{60v} - 1\right),$$ (Formula 3)

wherein N is the cumulative number of rubbings, v is the velocity (cm/s) of the substrate stage, and n and r is the speed (rpm) and radius (cm) of the rubbing roll, respectively. The spacing and depth of the microgrooves are optional without limitation, but the pre-tilt angle thereof is preferably near 0°.

The transparent polymer plastic substrate used for direct alignment should have a transparency equal to or greater than 80% and surface contact angle equal to or greater than 50°. A suitable transparent plastic substrate can be commercially available TAC, PET, or COC substrates. After one or multiple rubbings on the surface, the transparent polymer plastic substrates may have aligned liquid crystal molecules thereon. TAC is selected to be directly surface-treated as an alignment substrate.

An appropriate amount of DM is added to the UV-CLC solution system to be coated on the described alignment layer. After drying the coating, a positive A film-embedded negative C optically anisotropic coating is completed. In general, the references disclose that a little amount of a chiral compound added in the UV-CLC solution may induce the photopolymerizable rod-like liquid crystal monomers to be arranged in a highly twisted helical structure. Theoretically, the DM added in the UV-CLC solution system may restrain the photopolymerizable rod-like liquid crystal monomers to be arranged in a helical structure. When DM is added to the UV-CLC solution system, it mixes with the photopolymerizable rod-like liquid crystal monomer and restrains the function of the chiral compound. As such, the rod-like liquid crystal monomers are induced by the DM to re-arrange parallel to the film surface and be aligned along the alignment direction of the alignment layer. When linear polarization light pass through the film, its optical axis travels along the direction parallel to the film surface. Specifically, film composed of DM and the rod-like liquid crystal monomers has positive A optical symmetry ($n_x > n_y \sim n_z$). However, the other photopolymerizable rod-like liquid crystal monomers not mixed with the DM will form original negative C film, and linear polarization light passing through the film, will see its optical axis travels along the direction vertical to the film surface. The described positive A film and negative C film are macrophase separated. The positive A layer has positive out-of-plane retardation value ($R_{th}$) and the negative C layer has negative $R_{th}$, however, the net $R_{th}$ of the film composed of the positive A and negative C layers is negative due to the negative C layer still occupying a large ratio of the film.

The retardation film can be formed by the following steps. Firstly, the described liquid crystal mixture coating is filtered at room temperature, and then coated on the aligned substrate. The coating method includes spin coating, slot-die coating, and the likes. The coating is dried at room temperature to remove a great amount of the organic solvent, and then heated to a temperature lower than the clear point of the photopolymerizable rod-like liquid crystal monomers, and higher than the nematic phase point of the photopolymerizable rod-like liquid crystal monomers. As such, the rod-like liquid crystal monomers will be arranged in an aligned direction of the alignment substrate. After the rod-like monomers align, the coating is set and cooled to room temperature and exposed to UV-light to process photopolymerization for forming an optically anisotropic coating on the alignment substrate. The optically anisotropic coating has high transparency and high hardness. Because the DM is added to the photopolymerizable rod-like liquid crystal monomer solution, the minimal ratio amount of DM will mix with part of the rod-like monomers, wherein other pure rod-like monomers will be macrophase separated from the mixture. In the process of forming the film, the separated macrophases further form a two layered structure in the film due to non-uniform density, wherein the bottom layer is a positive A ($n_x > n_y \sim n_z$) optically anisotropic coating composed of the mixture of the DM and the rod-like monomers, and the top layer is a negative C ($n_x \sim n_y > n_z$) optically anisotropic coating composed of the rod-like monomers. The positive A and the negative C optically anisotropic coatings have a complementary effect, however, their retardation value will counteract with each other to result in a net negative C retardation value. The in-plane retardation values $R_0$ and out-of-plane retardation value $R_{th}$ of the optically anisotropic coating are defined as Formulae 4 and 5:

$$R_0 = (n_x - n_y) * d \quad \text{(Formula 4); and}$$

$$R_{th} = [(n_x + n_y)/2 - n_z] * d \quad \text{(Formula 5).}$$

In Formulae 4 and 5, $n_x$, $n_y$, $n_z$ are the refractive indices in the film surface direction (x or y) and film thickness direction (z), respectively. In particular, $n_x$ is defined as a refractive index of the slow-axis (maximum refractive index), and $n_y$ is defined as a refractive index of the fast-axis (minimum refractive index). d is film thickness. The retardation value of the optically anisotropic coating in the invention can be changed by different film thicknesses. As shown in Formulae 4 and 5, $R_0$ and $R_{th}$ are proportional to the film thickness. When film is thicker, $R_0$ and $R_{th}$ are correspondingly higher and vice versa. In one embodiment of the invention, the optically anisotropic coating has a thickness of 2.0 μm to 5.5 μm, wherein $R_0$ is less than 2 nm and $R_{th}$ is between 150 nm to 350 nm. The $R_0$ and $R_{th}$ can be modified by different film thicknesses and are not limited to the above values.

EXAMPLES

Property Measurements:
(1) Film Thickness and Refractive Index Measurements:
The film thickness (d) was measured by an a-stepper (Dektak 3ST surface profiler, commercially available from Veeco Instrument Co,). The total refractive index (n) of the film was measured by a refractive index analyzer (commercially available from n & k analyzer, model 1280).

(2) Rubbed PI Film Surface Topography Analysis:
The rubbed PI film surface topography was analyzed by an atomic force microscopy (AFM) such as an SPA-300HV (commercially available from Seiko Instruments Industry, Co., Ltd., Japan). In the AFM analysis, the operation model was tapping or non-contact, the probe was $Si_3N_4$ tips (SI-DF20), the force constant was 11N/m, and the resonance frequency was 125 kHz. The scanned AFM data was tilted and flat corrected by corresponding software to show an appropriate diagram.

(3) The Optical Retardation Value Measurement:
The in-plane and out-of-plane retardation values ($R_0$ and $R_{th}$) of the optically anisotropic coatings in Examples and Comparative Examples were analyzed by an automatic birefringence analyzer (Kobra-21ADH, commercially available from Oji Scientific Instruments). The measurement was processed according to a parallel Nicol rotation method by a wavelength of 589 nm.

The preparations of the optically anisotropic coatings formed on a glass substrate having alignment film thereon are described as below.

Example 1

Figure 1:
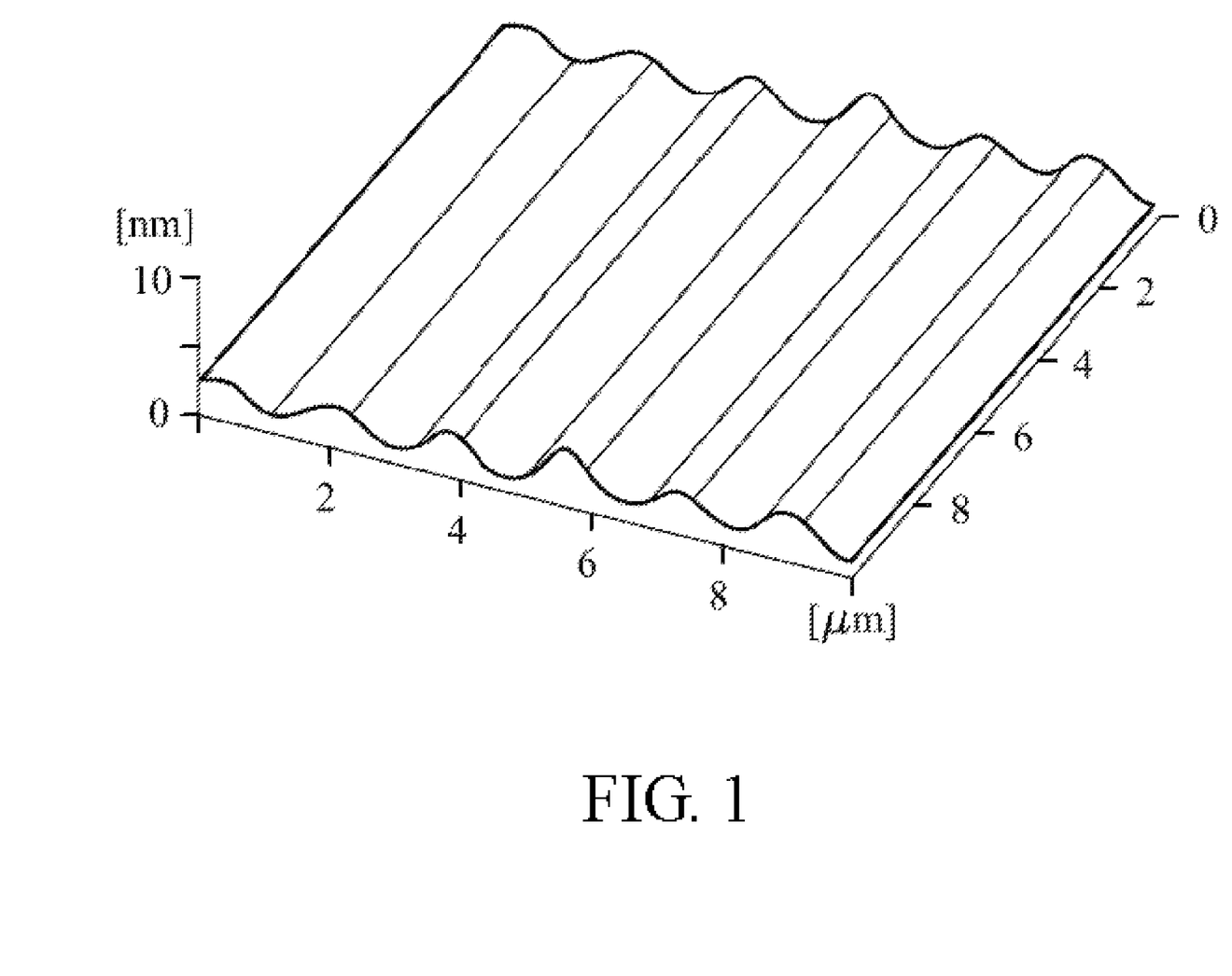
FIG. 1 shows an AFM image of the alignment surface of a rubbed PI film.

The preparation of an alignment film is described as below. The alignment layer material was polyamide (PI) prepared from poly(amic acid) (abbreviated as PAA). The PI precursor PAA solution was AL-12G (commercially available from Daily Polymer, Taiwan) having 7 wt % solid content. The PAA solution was filtered and then directly used without additional purification. The filtered PAA solution was two-step spin coated, 500 rpm for 10 seconds and then 1000 rpm for 30 seconds, on a dried clean non-alkali glass substrate, pre-baked at 110C for 10 minutes, and baked at 230° C. for 1 hour to obtain a clean, transparent, and slightly yellow film formed on the glass substrate. After rubbed several times, the alignment film was obtained. The thickness of the PI alignment film was about 0.5 μm. The surface topography of the PI alignment film was measured by an AFM, wherein the average distance between the microgrooves was about 1.7±0.5 nm, the average depth of the microgrooves was 2.8±0.3 nm, and the tilt angle of the inner groove was about 0°. Please see FIG. 1 for reference. In addition, the retardation value of the PI alignment film was usually low, wherein the $R_0$ (0.15 nm) and $R_{th}$ (1.1 nm) at a viewing angle of 0° was almost similar to that at different viewing angles.

The preparation of the retardation film is described as below. The optically anisotropic coating for forming the retardation film of the invention was prepared by directly adding disc-like molecules such as N,N-bis(3-methylphenyl)-N,N'-phenylbenzidine into a rod-like photopolymerizable liquid crystal monomer solution (RMS06-270, solid content 40 wt %, commercially available from Merck). The disc-like molecule amount was controlled to 2 wt % of the optically anisotropic coating. The N,N-bis(3-methylphenyl)-N,N'-phenylbenzidine was represented as Formula 6:

(Formula 6)

Figure 2:
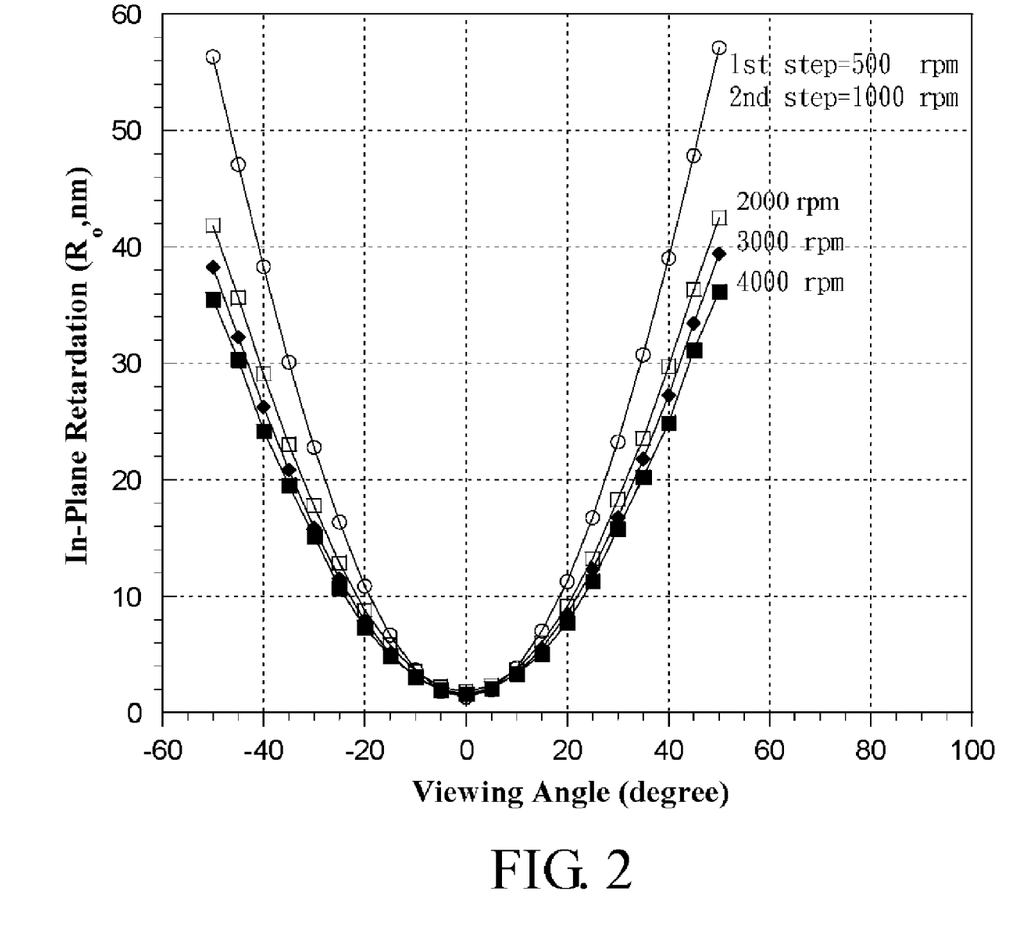
FIGS. 2-5 show in-plane retardation values ($R_O$) of optically anisotropic coatings prepared by different DM contents and different spin coating rates versus different viewing angles on the alignment surface of a rubbed PI film.

The optically anisotropic coating was filtered and then used without additional purification. The filtered optically anisotropic coating was single step spin coated, 3000 rpm for 30 seconds, on the PI alignment film. Subsequently, the coating was dried at room temperature for about 1 minute to macrophase separate the negative C and positive A optically anisotropic coating. The macrophase separated coating was then heated to a temperature lower than the clear point of the photopolymerizable rod-like liquid crystal monomers, and higher than the nematic phase point of the photopolymerizable rod-like liquid crystal monomers. For example, the heating temperature was 55° C., and the clear point of the photopolymerizable rod-like liquid crystal monomers was about 67° C. After maintaining the heating temperature for 1 minute, the liquid crystal molecules of the coating were aligned according to the rubbed direction of the PI alignment film. The aligned coating was exposed to UV light (wavelength of 365±10 nm and intensity of 18 mW/cm$^2$) for about 1 minute for photopolymerization, thereby forming an optically anisotropic coating of high hardness and high transparency on the alignment film. The resultant retardation film (rubbed PI film and the optically anisotropic coating) had a thickness of about 2.92 μm. The retardation film had $R_0$ of about 1.4 nm and $R_{th}$ of about 135 nm at a viewing angle of 0° as shown in Table 1, wherein the curve of $R_0$ versus different viewing angles is shown in FIG. 2.

Example 2

Figure 3:
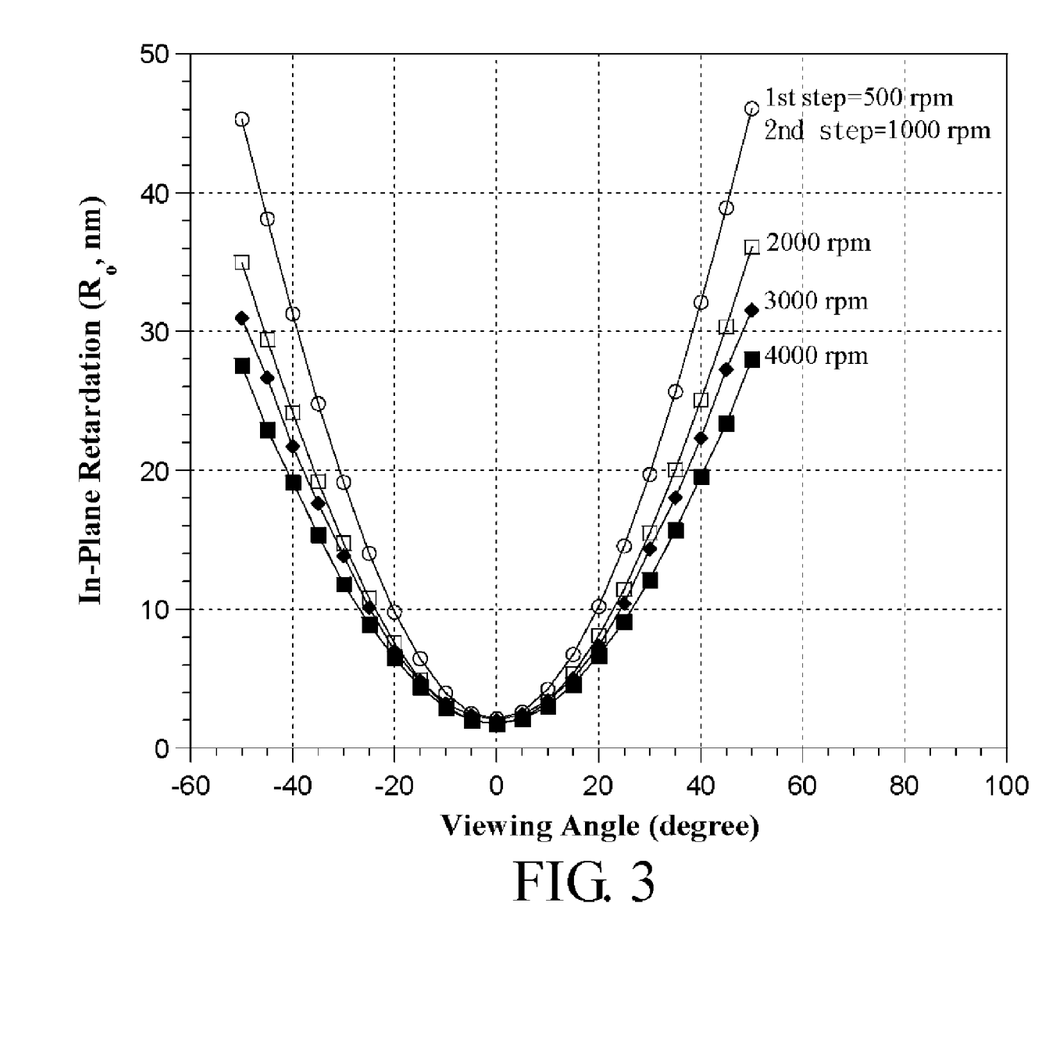

The preparation of an alignment film (similar to Example 1):

The composition of the optically anisotropic coating was similar to that for Example 1, wherein the only difference between Examples 1 and 2 was that the N,N-bis(3-methylphenyl)-N,N'-phenylbenzidine amount for Example 2 controlled to 3 wt % of the optically anisotropic coating. The other steps such as setting and drying the coating, heating and aligning the coating, and photopolymerization for preparing the optically anisotropic coating were the same as those in Example 1. The resultant retardation film (rubbed PI film and the optically anisotropic coating) had a thickness of about 2.86 μm. The retardation film had $R_0$ of about 2.0 nm and $R_{th}$ of about 100 nm at a viewing angle of 0° as shown in Table 1, wherein the curve of $R_0$ versus different viewing angles is shown in FIG. 3.

Example 3

The Preparation of an Alignment Film (Similar to Example 1):

The composition of the optically anisotropic coating was similar to that for Example 2, wherein the only difference between Examples 2 and 3 was that the spin coating step for Example 3 was 200 rpm for 30 seconds. The other steps such as setting and drying the coating, heating and aligning the coating, and photopolymerization for preparing the optically anisotropic coating were the same as those in Example 2. The resultant retardation film (rubbed PI film and the optically anisotropic coating) had a thickness of about 3.25 μm. The retardation film had $R_0$ of about 1.7 nm and $R_{th}$ of about 120 nm at a viewing angle of 0° as shown in Table 1, wherein the curve of $R_0$ versus different viewing angles is shown in FIG. 3.

Example 4

The Preparation of an Alignment Film is Similar to Example 1.

The composition of the optically anisotropic coating was similar to that for Example 2, wherein the only difference between Examples 2 and 4 is the spin coating step (1000 rpm for 30 seconds). The other steps such as setting and drying the coating, heating and aligning the coating, and photopolymerization for preparing the retardation film were the same as those in Example 2. The resultant retardation film (rubbed PI film and the optically anisotropic coating) had a thickness of about 3.45 μm. The retardation film had $R_0$ of about 1.9 nm and $R_{th}$ of about 125 nm at a viewing angle of 0° as shown in Table 1, wherein the curve of $R_0$ versus different viewing angles is shown in FIG. 3.

Example 5

Figure 4:
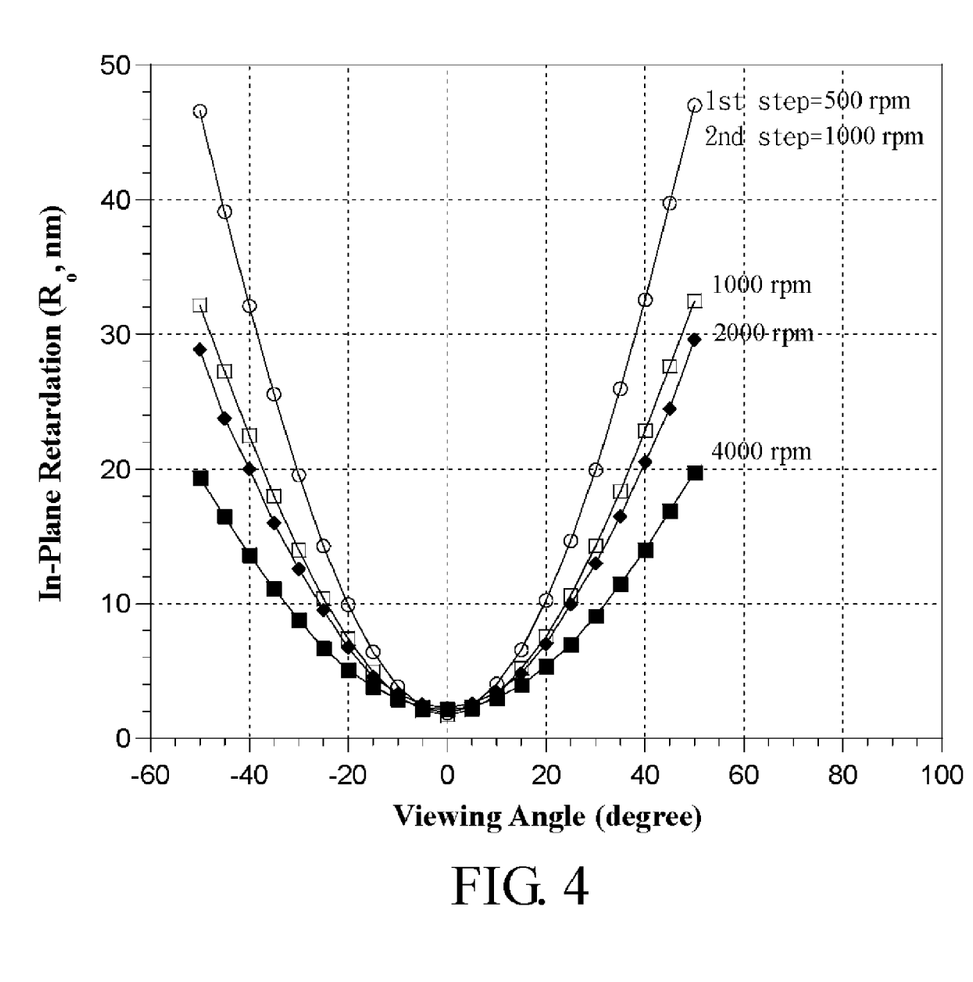

The Preparation of an Alignment Film (Similar to Example 1):

The composition of the optically anisotropic coating was similar to that for Example 1, wherein the differences between Examples 1 and 5 were that the N,N-bis(3-methylphenyl)-N,N'-phenylbenzidine amount for Example 5 was controlled to 5 wt % of the optically anisotropic coating and the spin coating step for Example 5 was 200 rpm for 30 seconds. The other steps such as setting and drying the coating, heating and aligning the coating, and photopolymerization for preparing the optically anisotropic coating were the same as those in Example 1. The resultant retardation film (rubbed PI film and the optically anisotropic coating) had a thickness of about 3.08 μm. The retardation film had $R_0$ of about 2.2 nm and $R_{th}$ of about 92 nm at a viewing angle of 0° as shown in Table 1, wherein the curve of $R_0$ versus different viewing angles is shown in FIG. 4.

Example 6

The Preparation of an Alignment Film (Similar to Example 1):

The composition of the optically anisotropic coating was similar to that for Example 1, wherein the differences between Examples 1 and 6 were that the N,N-bis(3-methylphenyl)-N,N'-phenylbenzidine amount for Example 6 was controlled to 8 wt % of the optically anisotropic coating and the spin coating step for Example 6 was 400 rpm for 30 seconds. The other steps such as setting and drying the coating, heating and aligning the coating, and photopolymerization for preparing the optically anisotropic coating were the same as those in Example 1. The resultant retardation film (rubbed PI film and the optically anisotropic coating) had a thickness of about 2.94 μm. The retardation film had $R_0$ of about 1.9 nm and $R_{th}$ of about 39 nm at a viewing angle of 0° as shown in Table 1.

Comparative Example 1

Figure 5:
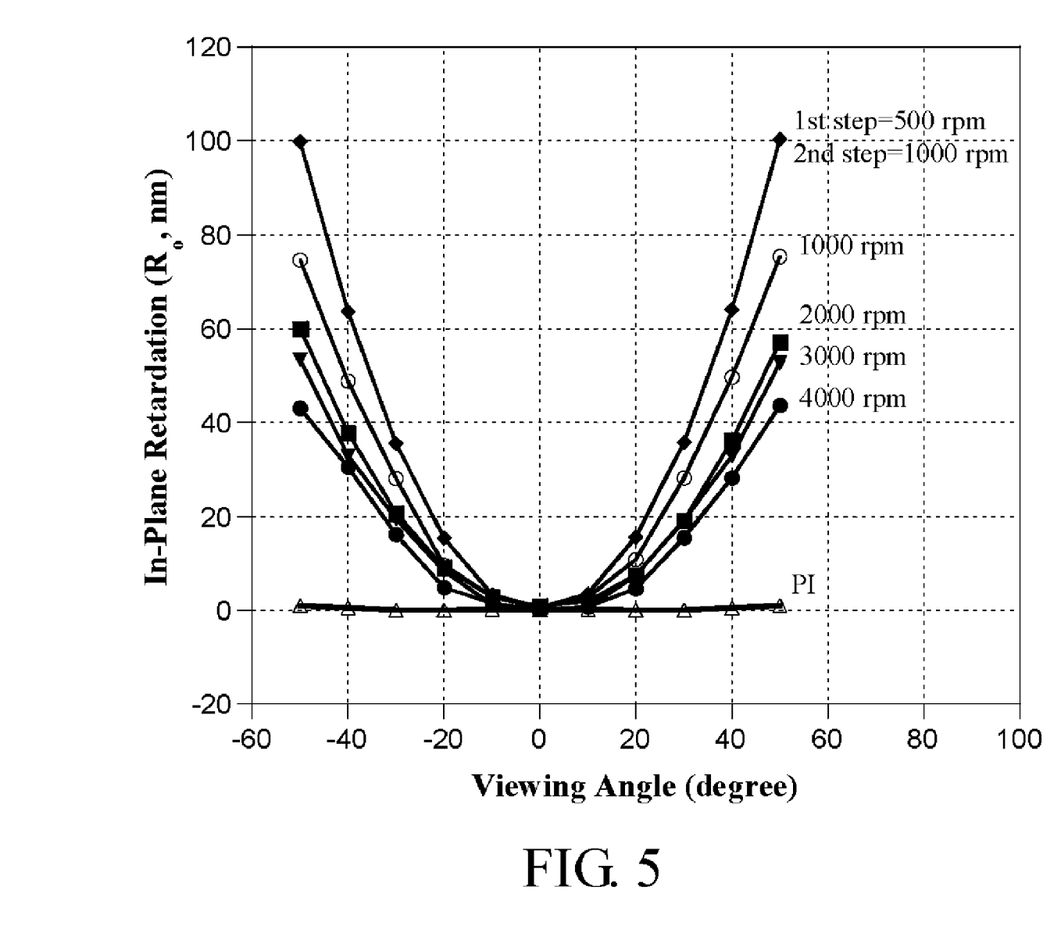

The Preparation of an Alignment Film (Similar to Example 1):

The preparation of the optically anisotropic coating is described as below. The optically anisotropic coating for forming the optically anisotropic coating of the invention was directly prepared by the rod-like photopolymerizable liquid crystal monomer solution (RMS06-270, solid content 40 wt %, commercially available from Merck). The optically anisotropic coating was filtered and then used without additional purification. The filtered optically anisotropic coating was two-step spin coated, 500 rpm for 10 seconds and then 1000 rpm for 30 seconds, on the PI alignment film. Subsequently, the coating was dried at room temperature for about 1 minute, and then heated to a temperature lower than the clear point of the photopolymerizable rod-like liquid crystal monomers, and higher than the nematic phase point of the photopolymerizable rod-like liquid crystal monomers. For example, the heating temperature was 55° C., and the clear point of the photopolymerizable rod-like liquid crystal monomers was about 67° C. After maintaining the heating temperature for 1 minute, the liquid crystal molecules of the coating were aligned according to the rubbed direction of the PI alignment film. The aligned coating was exposed to UV light (wavelength of 365±10 nm and intensity of 18 mW/cm$^2$) for about 1 minute for photopolymerization, thereby forming an optically anisotropic coating of high hardness and high transparency on the alignment film. The resultant retardation film (rubbed PI film and the optically anisotropic coating) had a thickness of about 5.5 µm. The retardation film had $R_0$ of about 0.6 nm and $R_{th}$ of about 370 nm at a viewing angle of 0° as shown in Table 1, wherein the curve of $R_0$ versus different viewing angles is shown in FIG. 5.

Comparative Example 2

The Preparation of an Alignment Film (Similar to Example 1):

The composition of the optically anisotropic coating was similar to that for Comparative Example 1, wherein the only difference between Comparative Examples 1 and 2 was that the spin coating step for Comparative Examples 2 was 200 rpm for 30 seconds. The other steps such as setting and drying the coating, heating and aligning the coating, and photopolymerization for preparing the optically anisotropic coating were the same as those in Comparative Example 1. The resultant retardation film (rubbed PI film and the optically anisotropic coating) had a thickness of about 3.0 µm. The retardation film had $R_0$ of about 0.9 nm and $R_{th}$ of about 194 nm at a viewing angle of 0° as shown in Table 1, wherein the curve of $R_0$ versus different viewing angles is shown in FIG. 5.

The preparation of the optically anisotropic coatings formed on alignment TAC transparent substrates are described as below.

Example 7

The preparation of an alignment substrate is described as below. The TAC transparent substrate (Toy80UL, commercially available from Fuji Film, Japan) of 80 µm thickness was directly used without further treatment. The TAC transparent substrate was directly rubbed one or more times until its surface showed aligned liquid crystal molecules.

Figure 7:
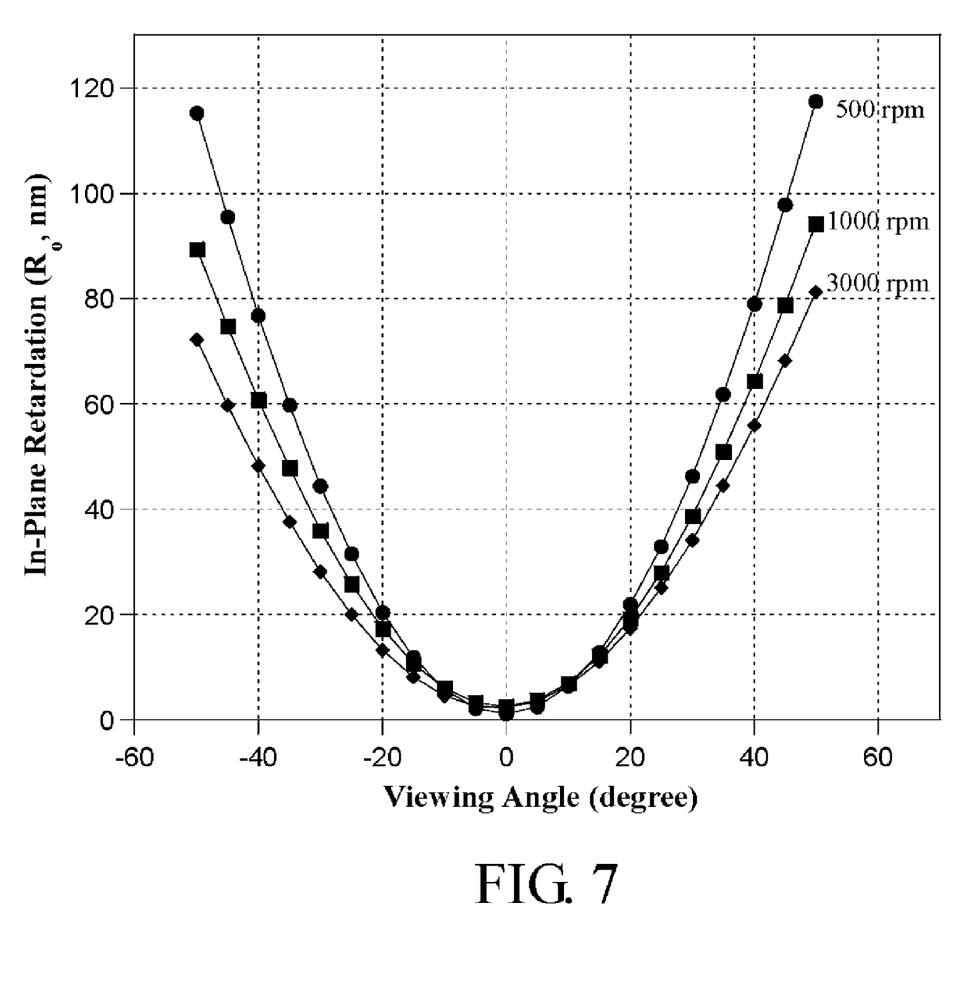
FIGS. 7-8 show in-plane retardation values ($R_O$) of the retardation films comprising the optically anisotropic coatings prepared by different DM contents and different spin coating rates versus different viewing angles on the alignment transparent substrate (TAC).

The composition of the optically anisotropic coating was similar to that for Example 1, wherein the only difference between Examples 1 and 7 was that the N,N-bis(3-methylphenyl)-N,N'-phenylbenzidine amount for Example 7 was controlled to 1 wt % of the optically anisotropic coating and the spin coating step for Example 7 was 500 rpm for 30 seconds. The liquid crystal mixture was single step spin coated on the TAC alignment substrate. Subsequently, the coating was dried at room temperature for about 1 minute to macrophase separate the negative C and positive A optically anisotropic coating. The macrophase separated coating was then heated to a temperature lower than the clear point of the photopolymerizable rod-like liquid crystal monomers, and higher than the nematic phase point of the photopolymerizable rod-like liquid crystal monomers. For example, the nematic phase point was about 45° C., the heating temperature was 55° C., and the clear point of the photopolymerizable rod-like liquid crystal monomers was about 67° C. After maintaining the heating temperature for 1-3 minutes, the liquid crystal molecules of the coating were aligned according to the rubbed direction of the PI alignment film. The aligned coating was exposed to UV light (wavelength of 365±10 nm and intensity of 18 mW/cm$^2$) at room temperature under nitrogen for about 1 minute for photopolymerization, thereby forming an optically anisotropic coating of high hardness and high transparency on TAC. Finally, the resultant retardation film (TAC and the optically anisotropic coating) had a total thickness of about 93.4 µm. The retardation film had $R_0$ of about 1.1 nm and $R_{th}$ of about 460 nm at a viewing angle of 0° as shown in Table 1, wherein the curve of $R_0$ versus different viewing angles is shown in FIG. 7.

Example 8

Figure 8:
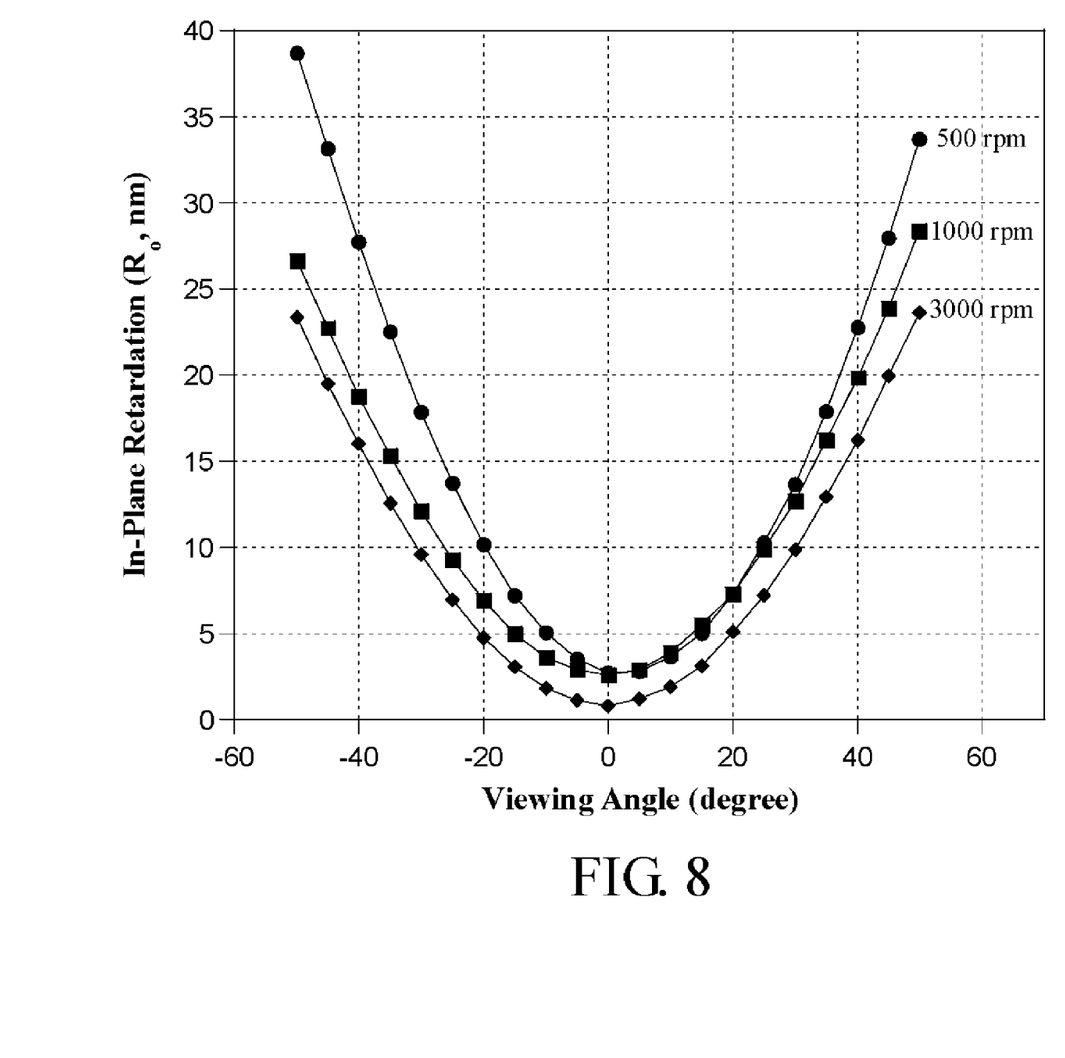

The Preparation of TAC Transparent Alignment Substrate (Similar to Example 7):

The composition of the optically anisotropic coating was similar to that for Example 1, wherein the differences between Examples 1 and 8 were that the N,N-bis(3-methylphenyl)-N,N'-phenylbenzidine amount for Example 8 was controlled to 3 wt % of the optically anisotropic coating and the spin coating step for Example 8 was 300 rpm for 30 seconds. The other steps such as coating, setting and drying the coating, heating and aligning the coating, and photopolymerization for preparing the optically anisotropic coating were the same as those in Example 7. Finally, the resultant retardation film (TAC and the optically anisotropic coating) has a total thickness of about 85 µm. The retardation film has $R_0$ of about 0.8 nm and $R_{th}$ of about 98 nm at a viewing angle of 0° as shown in Table 1, wherein the curve of $R_0$ versus different viewing angles is shown in FIG. 8.

TABLE 1

(the measured characteristic properties)

| | DM content (wt %) | Film thickness (d, µm) | n | $n_x$ | $n_y$ | $n_z$ |
|---|---|---|---|---|---|---|
| Comparative Example 1 | 0 | 5.5 | 1.58 | 1.60286 | 1.60219 | 1.53495 |
| Comparative Example 2 | 0 | 3.0 | 1.58 | 1.60123 | 1.60117 | 1.53760 |
| Example 1 | 2 | 2.92 | 1.565 | 1.580605 | 1.580096 | 1.534299 |
| Example 2 | 3 | 2.86 | 1.519 | 1.530978 | 1.530258 | 1.495764 |
| Example 3 | 3 | 3.25 | 1.556 | 1.568624 | 1.568102 | 1.531274 |
| Example 4 | 3 | 3.45 | 1.569 | 1.581377 | 1.580801 | 1.544822 |
| Example 5 | 5 | 3.08 | 1.532 | 1.542330 | 1.541632 | 1.512038 |
| Example 6 | 8 | 2.94 | 1.550 | 1.554761 | 1.554110 | 1.541129 |
| Example 7 | 1 | 93.4 | 1.631 | 1.632642 | 1.632635 | 1.627723 |

TABLE 1-continued (the measured characteristic properties)

| Example 8 | 3 | 85.0 | 1.69 | 1.690389 | 1.690380 | 1.689231 |

| | $R_o$ (nm) | $R_{th}$ (nm) |
|---|---|---|
| Comparative Example 1 | 0.6 | 370 |
| Comparative Example 2 | 0.9 | 194 |
| Example 1 | 1.4 | 135 |
| Example 2 | 2.0 | 100 |
| Example 3 | 1.7 | 120 |
| Example 4 | 1.9 | 125 |
| Example 5 | 2.2 | 92 |
| Example 6 | 1.9 | 39 |
| Example 7 | 1.1 | 460 |
| Example 8 | 0.8 | 98 |

Figure 6:
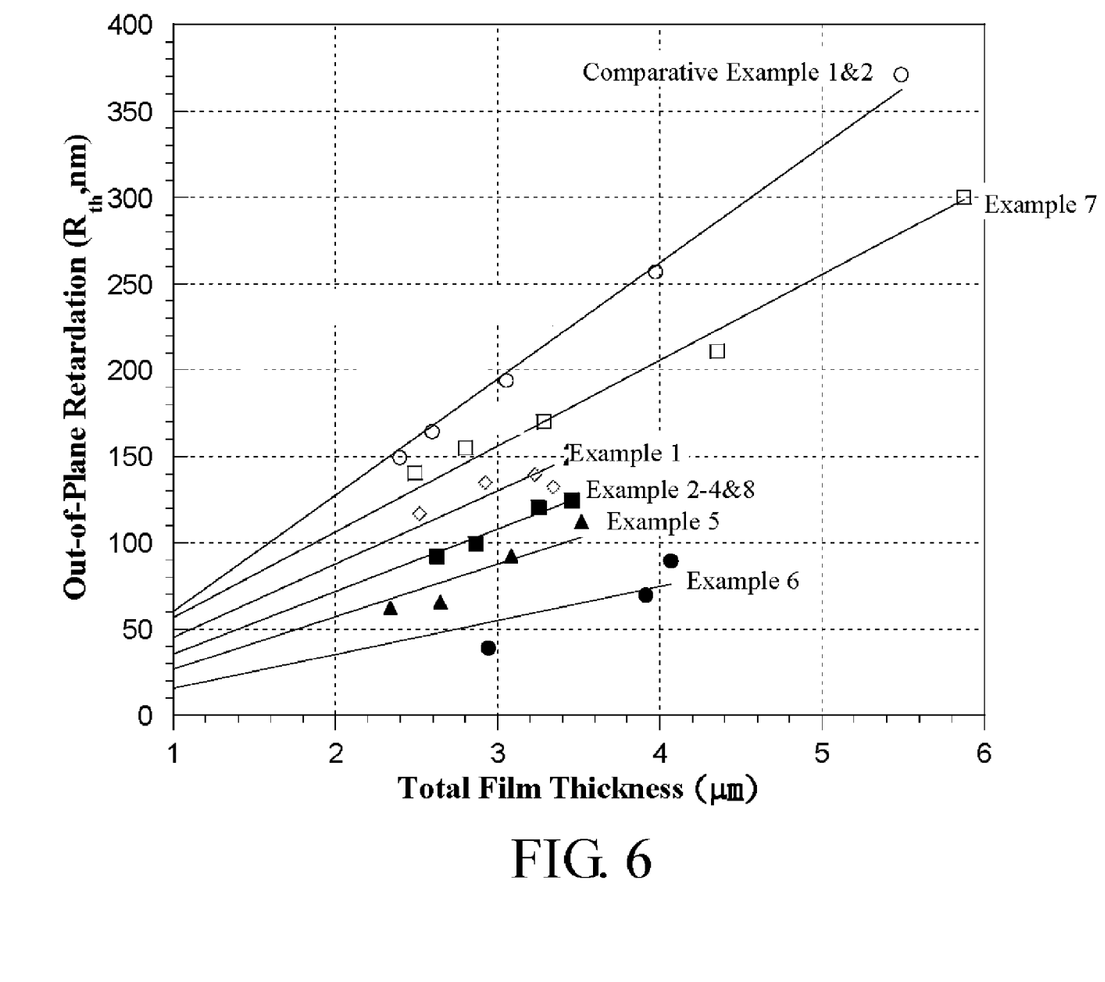
FIG. 6 shows out-of-plane retardation values ($R_{th}$) of optically anisotropic coatings prepared by different DM contents versus different thicknesses.

The measured characteristic properties of the Examples and the Comparative Examples are listed in Table 1. As shown in Table 1, the Examples and the Comparative Examples, showed three dimensional refractive indices ($n_x$, $n_y$, and $n_z$) having relations therebetween such as $n_x \sim n_y > n_z$ to fit negative C symmetry. The negative C symmetry was also apparent in symmetrical U-shaped curves of $R_0$ versus viewing angle diagram, wherein the $R_0$ at a viewing angle of 0° was near zero. Please see FIGS. 2-5 for reference. The optically anisotropic coating thickness was controlled by tuning the spin coating rate, thereby determining the $R_0$ for large viewing angles. In general, a high spin coating rate resulted in a low $R_0$ and vice versa. Referring to FIG. 3, spin coating of 4000 rpm resulted in a $R_0$ of about 28 nm at a viewing angle of ±50°, and spin coating of 1000 rpm resulted in a $R_0$ of about 36 nm at a viewing angle of ±50°. For same spin coating rates, the coatings with higher DM content resulted in lower $R_0$ at large viewing angle. Please see FIGS. 2 and 4 for reference. It was shown that DM content of the coating not only influenced $R_0$ but also $R_{th}$ for large viewing angles. As shown in Table 1, similar film thicknesses (about 3.0 μm) had $R_{th}$ of about 135 nm for 2 wt % DM content, and $R_{th}$ of about 39 nm for 8 wt % DM content. As shown in FIG. 6, the $R_{th}$ was increased proportional to the film thickness for the same DM content. Please see Formula 5 for reference. When DM content increased, the helical arrangement of the CLC molecules were restrained and further transformed to a parallel arrangement, thereby forming a positive A macrophase layer. The $R_{th}$ of the positive A layer was counteracted by the $R_{th}$ of the negative C layer to obtain a smaller $R_{th}$. As shown in FIG. 6, a film thickness of about 3.0 μm with $R_{th}$ of about 39 nm showed that a positive A layer with sufficient thickness was formed in the optically anisotropic coating. Accordingly, a positive A film-embedded negative C optically anisotropic coating was formed by a single step coating process in the invention. As shown in FIGS. 7 and 8, the optically anisotropic coating and corresponding formation method of the invention can be directly applied on a TAC alignment substrate, thereby saving alignment film costs.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is
1. A retardation film, comprising:
an alignment substrate; and
an optically anisotropic coating on the alignment substrate,
wherein the optically anisotropic coating comprises a photopolymerizable cholesteric liquid crystal composition and rectangular disc-like molecules,
wherein the photopolymerizable cholesteric liquid crystal composition comprises:
(a) achiral photopolymerizable rod-like liquid crystal molecules;
(b) a chiral compound;
(c) a photo initiator; and
(d) a nonionic surfactant,
wherein the rectangular disc-like molecules have a general formula:

wherein each of $R_1$ and $R_2$, being the same or different, is hydrogen, alkyl group, phenyl group, or benzyl group.
2. The retardation film as claimed in claim 1, wherein the photopolymerizable cholesteric liquid crystal composition and the rectangular disc-like molecules have a weight ratio of about 40:0.5 to 40:8.
3. The retardation film as claimed in claim 1, wherein the rectangular disc-like molecules have a size substantially similar to the (a) achiral photopolymerizable rod-like liquid crystal molecules.
4. The retardation film as claimed in claim 1, wherein the optically anisotropic coating is macrophase separated to a positive A liquid crystal composition and a negative C liquid crystal composition, the positive A liquid crystal composition is composed of the (a) achiral photopolymerizable rod-like liquid crystal molecules and the rectangular disc-like molecules, and the negative C liquid crystal composition is composed of the photopolymerizable cholesteric liquid crystal composition.
5. The retardation film as claimed in claim 1 has an in-plane retardation value ($R_0$) of 0.1 nm to 1.5 nm and an out-of-plane retardation value ($R_{th}$) of 15 nm to 460 nm.
6. The retardation film as claimed in claim 1, wherein the alignment substrate comprises a transparent substrate having an alignment film thereon, or a surface-treated transparent substrate.
7. The retardation film as claimed in claim 1, wherein the photopolymerizable cholesteric liquid crystal composition further comprises an organic solvent.
8. A method for forming a retardation film, comprising:
providing an alignment substrate;
forming an optically anisotropic coating on the alignment substrate,
wherein the optically anisotropic coating comprises a photopolymerizable cholesteric liquid crystal composition and rectangular disc-like molecules, wherein the photopolymerizable cholesteric liquid crystal composition comprises:
(a) achiral photopolymerizable rod-like liquid crystal molecules;
(b) a chiral compound;
(c) a photo initiator;
(d) a nonionic surfactant; and
(e) an organic solvent;
setting and drying the optically anisotropic coating;
heating the optically anisotropic coating to align with the liquid crystal molecules according to the alignment direction of the alignment substrate; and UV curing the optically anisotropic coating,
wherein the rectangular disc-like molecules have a general formula:

wherein each of $R_1$ and $R_2$, being the same or different, is hydrogen, alkyl group, phenyl group, or benzyl group.

9. The method as claimed in claim 8, wherein the photopolymerizable cholesteric liquid crystal composition's solid content and the rectangular disc-like molecules have a weight ratio of about 40:0.5 to 40:8.

10. The method as claimed in claim 8, wherein the step of setting and drying the optically anisotropic coating makes the optically anisotropic coating macrophase separated to a positive A liquid crystal composition and a negative C liquid crystal composition, the positive A liquid crystal composition is composed of the (a) achiral photopolymerizable rod-like liquid crystal molecules and the rectangular disc-like molecules, and the negative C liquid crystal composition is composed of the photopolymerizable cholesteric liquid crystal composition.

11. The method as claimed in claim 8, wherein the rectangular disc-like molecules have a size substantially similar to the (a) achiral photopolymerizable rod-like liquid crystal molecules.

12. The method as claimed in claim 8, wherein the step of forming the optically anisotropic coating on the alignment substrate comprises spin coating or extrusion coating.

13. The method as claimed in claim 8, wherein the step of heating the optically anisotropic coating has a temperature lower than the clear point of the (a) achiral photopolymerizable rod-like liquid crystal molecules, and higher than the nematic phase point of the (a) achiral photopolymerizable rod-like liquid crystal molecules.

14. The method as claimed in claim 8, wherein the alignment substrate comprises a transparent substrate having an alignment film thereon, or a surface-treated transparent substrate.

* * * * *